United States Patent [19]
Schlaudroff et al.

[11] Patent Number: 6,100,602
[45] Date of Patent: Aug. 8, 2000

[54] SERVICE HARNESS OVERLAY PROCEDURE FOR A MOBILE VEHICLE

[76] Inventors: Douglas A. Schlaudroff, 11520 Winchester Rd., Fort Wayne, Ind. 46819; Gregory S. Didier, 1366 Kope Kon Point, Coldwater, Mich. 49036

[21] Appl. No.: 09/162,581

[22] Filed: Sep. 29, 1998

[51] Int. Cl.$^7$ .......................................................... B60L 1/00
[52] U.S. Cl. .............................................................. 307/10.1
[58] Field of Search ...................................... 439/502, 503, 439/507; 361/826, 827; 174/71 R, 72 R, 72 A; 307/10.1

[56] References Cited

U.S. PATENT DOCUMENTS 5,818,673  10/1998  Matsumaru et al. ..................... 361/163

*Primary Examiner*—Jeffrey Gaffin
*Assistant Examiner*—R Rios Cuevas

[57] ABSTRACT

A process for replacing a multi-functional original installed harness for a harness or cable for a mobile vehicle in a efficient and time saving manner. More specifically, the procedure involves: (i) identifying the critical electrically engaged components engaged to a multi-functional original installed harness for an engine that requires replacement; (ii) disconnecting the original installed electrical harness from only those critical components; (iii) running an electrical service overlay harness physically adjacent to the original harness; and (iv) engaging the critical components to the service overlay harness. This triage-like repair saves a significant amount of time and effort. The critical components for a vehicle are those in which an electrical fault in a circuit in the multi-functional original installed harness will result in the engine of the vehicle failing to start, failing to run, or will provide a service light or fault light to the driver in the cab of the vehicle indicating the need for immediate service.

7 Claims, 3 Drawing Sheets

SERVICE HARNESS OVERLAY PROCEDURE FOR A MOBILE VEHICLE

SERVICE HARNESS OVERLAY PROCEDURE FOR A MOBILE VEHICLE

BACKGROUND OF INVENTION

This invention relates to a process for replacing a multi-functional original installed electrical harness or cable for a mobile vehicle in an efficient and time saving manner. More specifically, the procedure involves: identifying the critical electrically engaged components on a service harness requiring replacement; disconnecting the original harness from only those critical components; running a service overlay harness physically adjacent to the original harness; and engaging the critical components to the overlay harness.

PRIOR ART

Mobile vehicles such as medium and heavy duty trucks and school buses generally have complex multi-functional electrical harnesses engaged to the electronic controller for the vehicle's engine. These original installation electrical harnesses are engaged to electrically operated or electrical signal generating components throughout the vehicle. Some of these components are critical components in that a loss or change of electrical continuity will cause the engine to cease operation or will result in an error indicator for immediate vehicle service to alight on the driver's dashboard indicator. Included in these critical components are the engine electronic control module (ECM), the ECM ignition tie-in, the vehicle air conditioning system fan refrigerant pressure switch, the engine cooling fan solenoid, the low coolant probe for the engine coolant system, and the vehicle speed sensor.

There has been an ongoing problem with engine harness abrasion in heavy duty trucks. The abrasion seems to be caused by vibration due to engine harmonics as well as road vibration and dirt. These factors cause the conduit of the harness to wear through the insulation of the individual circuits of the harness. After the insulation is worn, the copper core of the circuit wiring is exposed. This causes short, open, or high resistance circuits. One of the main effects from these short, open, or high resistive conditions has been engine fault codes being triggered, some causing engine shut down or malfunction and others triggering warning lights notifying the driver of the need for immediate service. Under the prior art repair method, the entire multi-functional original installed harness would need to be replaced. This practice became a high cost issue for truck owners, as replacement of the entire multi-functional original installed harness was engaged to both critical engine components and non-critical engine components. Replacement of the entire originally installed harness involved disconnecting all of the critical and non-critical components and removal of the original harness. A new harness would be physically routed and then electrically engaged to both the critical and non-critical components of the vehicle. This could take as long as four (4) hours, even for skilled technicians.

A process or procedure is needed for performing the equivalent of a triage-like repair of an electrical fault in a vehicle. Only those circuits which can cause the engine to cease to operate, fail to start, or result in an error indicator alight in the cab of vehicle (i.e. critical) should be disconnected. To date, such a process for performing a triage-like repair of an electrical fault in a vehicle electrical harness has not been suggested.

SUMMARY OF INVENTION

A primary objective of this invention is to provide a process for performing a triage-like repair of an electrical fault in a vehicle electrical harness. Only those circuits which can cause the vehicle engine to cease to operate, fail to start, or result in an error indicator in the cab of the vehicle (i.e. critical) will be re-terminated by use of a service overlay harness. The procedure for this repair involves identifying the critical electrically engaged components on a multi-functional original installed harness for the engine. The critical components are disconnected from the original harness. An overlay electrical harness is physically laid adjacent to the original harness. The original harness remains connected electrically to non-critical components. The critical components are then electrically engaged to the service overlay harness.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
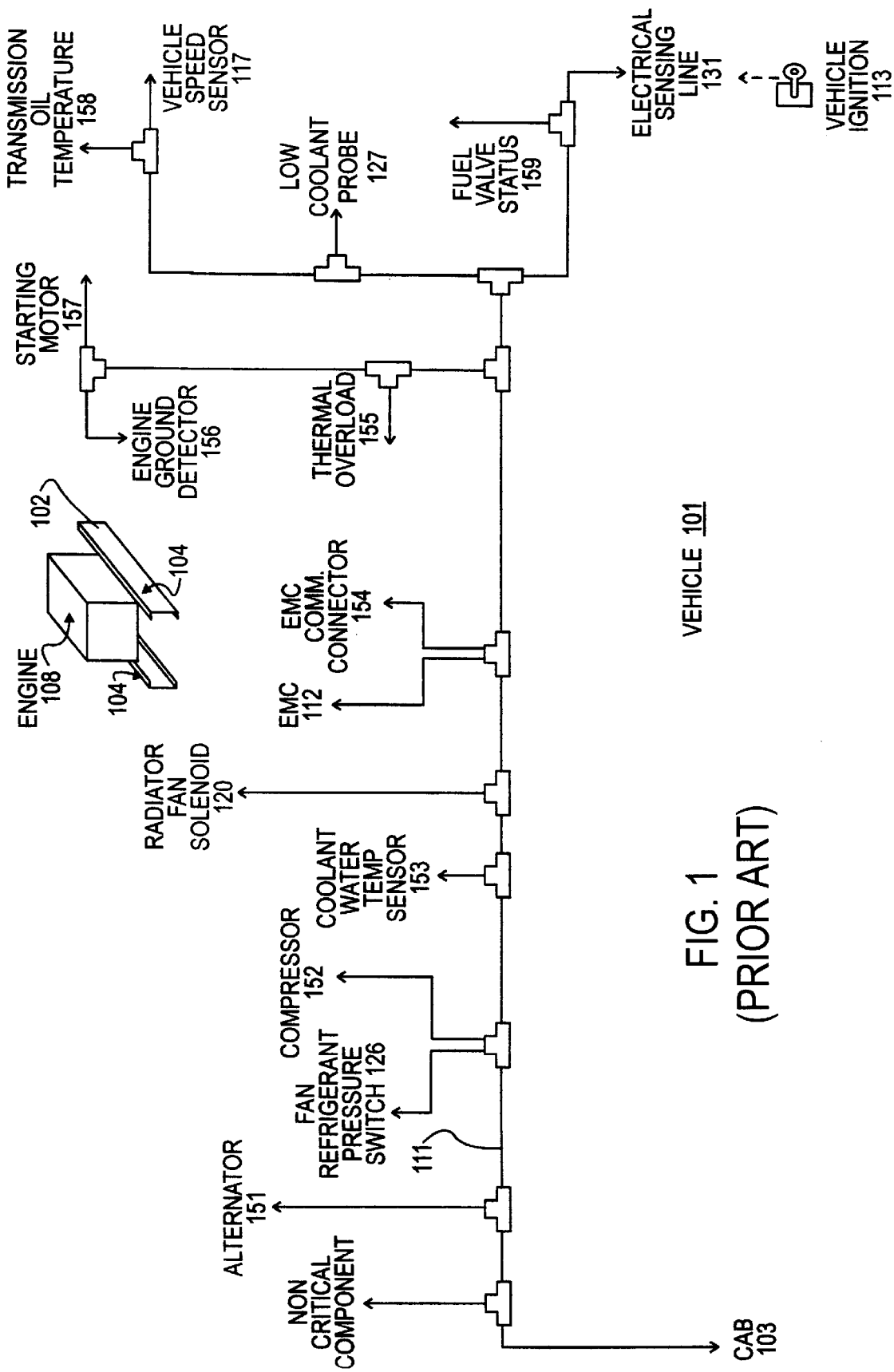
FIG. 1 is a diagrammatic view of a multi-functional original installed harness for an engine of a vehicle for which an embodiment of the process of this invention could be used to repair a fault.
Figure 2:
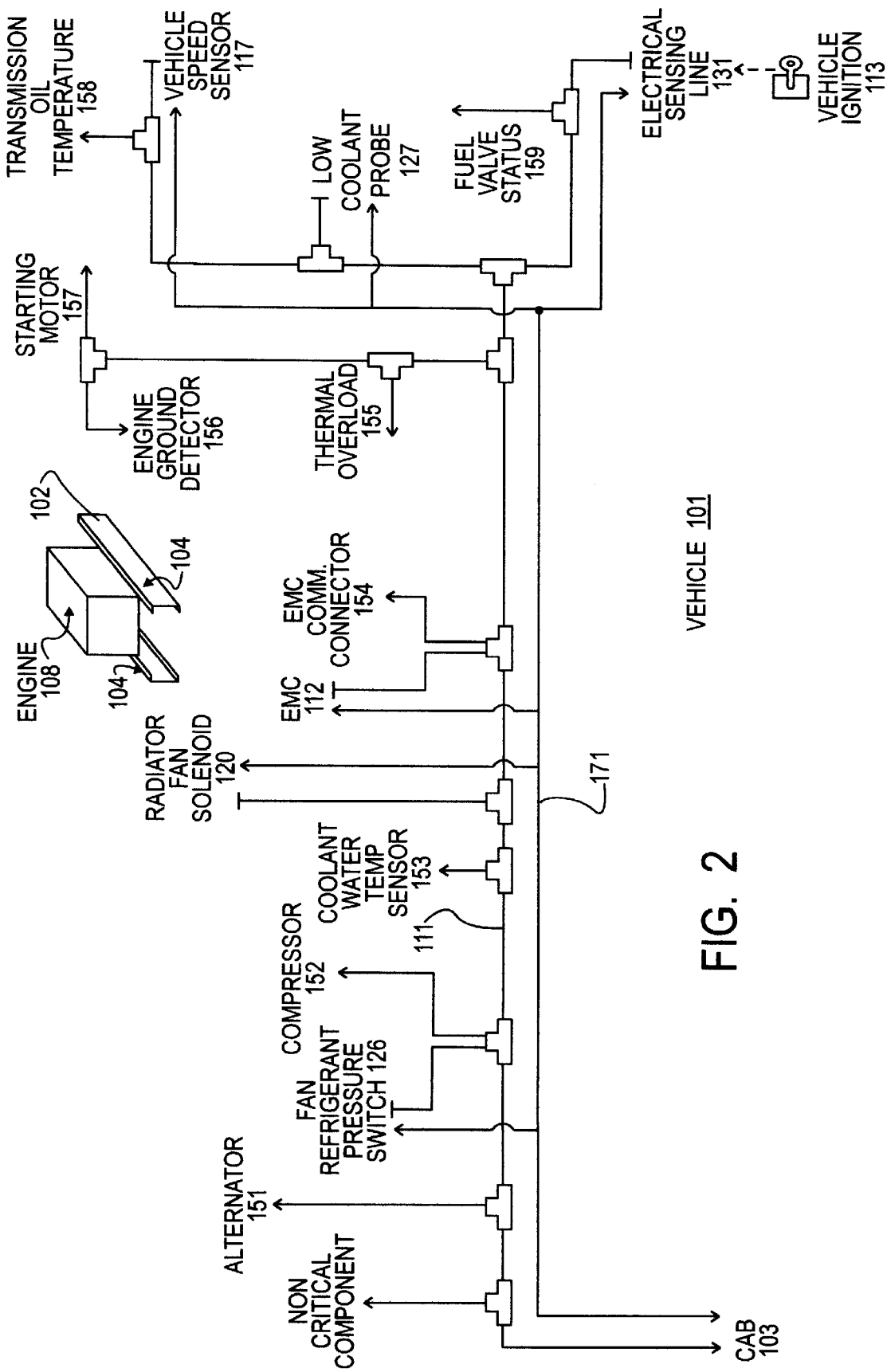
FIG. 2 is a diagrammatic view of a service overlay harness used to repair a fault in the multi-functional service harness of FIG. 1 in accordance with the process of this procedure.
Figure 3:
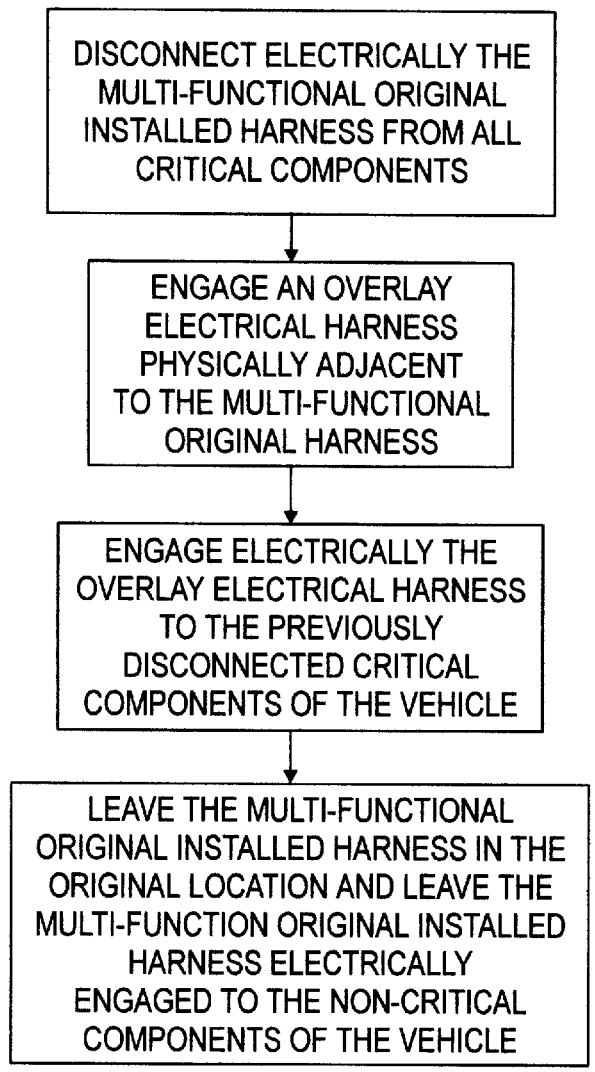
FIG. 3 is a flow chart of a service harness overlay procedure for a mobile vehicle in accordance with this invention.

Referring now to the drawings in greater detail, in FIG. 1, there is shown a multi-functional original installed harness 111 for an engine 108 of a vehicle 101 engaged to both critical and non-critical components of the vehicle. In FIG. 2, there is a service overlay harness 171 for an engine 108 of a vehicle 101 engaged to critical components of the vehicle 101. The vehicle 101 is generally comprised of a chassis 102 and a cab 103 for the driver. The chassis 102 is comprised of two frame rails 104 which are generally parallel to each other. The frame rails 104 are joined by cross members. Axles are engaged to the front and rear of the frame rails 104. An engine 108 is engaged to the frame rails 104 through the cross members 105. A transmission is engaged to the engine 108 and to a driveline which is engaged to the rear axle 106. An electronic control module 112 to control the engine 108 is engaged electrically to the engine 108. The cab 103 is engaged to the chassis 102. A driver of the vehicle 101 sits in the cab 103 to operate the vehicle 101. A vehicle speed sensor 117 is mechanically engaged to either the transmission or the driveline with an output being proportional to the speed of the vehicle 101. The vehicle engine 108 has a coolant system which includes a radiator, radiator coolant piping, and a radiator fan. The radiator fan 119 operates through a clutch as a direct drive from the engine 108; the clutch is controlled by a radiator fan solenoid. Additionally, the cab 103 has an air conditioning system which has a compressor, a condenser and an evaporator which are mechanically engaged to refrigerant piping. A high pressure output side of the compressor of the refrigerant piping contains a fan refrigerant pressure switch 126 which detects compressor exhaust pressure of the refrigerant. The coolant piping 118 contains a low engine coolant probe. The electronic control module 112 is engaged to both critical components and non-critical components of the vehicle 101 through a multi-functional original installed harness 111. The multi-functional original installed harness 111 is physically engaged to the electronic control module 112 and then is engaged via harness brackets 160 (not shown) to the chassis 102 with at least one engagement port to the cab 103 electrical system. On INTERNATIONAL® trucks, manufactured by Navistar International Transportation Corp., critical components include: the electronic control module 112; an electrical sensing line 131 engaged to vehicle ignition 113 within the cab 103; the vehicle speed sensor 117; the low engine coolant probe 127; and the fan refrigerant pressure switch 126. The critical components for each vehicle may vary but they will always include all components that an electrical fault in the circuit contained within the electric service harness 111 will result in the engine 108 failing to start or to run, or will result in a trouble light or error message indicator light to a driver in the cab 103. The fan refrigerant pressure switch 126, the low engine coolant probe 127, the vehicle speed sensor 117, and the electrical sensing line 131 from the ignition 113 are all signals which provide a status of the vehicle 101 and are low voltage signals very susceptible to resistance changes. An increase in resistance or decrease in resistance along one of these status circuits on a multi-functional original installed harness 111 will result in fault codes being recorded within the electronic control module 112. These fault codes will either cause the engine 108 to fail to run, fail to start, or will provide an indicator light to the driver of the vehicle 101 demonstrating the need for immediate or very prompt service. The fan solenoid 120 is operated via electrical signals passing the multi-functional electrical harness 111, energizing of the fan clutch to engage the fan 119 to the engine 108 to operate the fan 119. A change in resistance in circuit to the fan solenoid 120 will also cause a fault code or error message for service to be provided in the cab 103. Non-critical electrically engaged components include all components that neither prevent the engine 108 from starting or running, nor provide electrical fault codes to the electrical control module 112 prompting the driver to obtain immediate vehicle service. On INTERNATIONAL® trucks, non-critical components will include an alternator 151 for the engine 108, a refrigerant compressor 152, an engine coolant water temperature sensor 153, an ECM J1922 communications connector 154, an engine ground detector 156, an engine starting motor 157, a transmission oil temperature indicator 158, and a fuel valve 159 status. While some of these non-critical components are important, there are other indications as to the status of these components other than the electrical signals transported along the multi-functional original installed harness 111. The ability to determine the status of these non-critical components from means other than the electrical signals on the original installed harness 111 allows the components to be considered non-critical components as far as the process described in this invention.

The process for repairing an electrical fault in a circuit within the multi-functional original installed harness 111 is as follows. The technician will electrically disconnect the multi-functional electrical harness 111 from all critical components of the vehicle 101. An overlay electrical service harness 171 will be physically run adjacent to the multi-functional original installed harness 111 and will be engaged to the chassis 102 and cab 103 through the same harness brackets 160. The technician will then electrically engage the overlay electrical harness 171 to the critical components of the vehicle 101, previously disconnected from the multi-functional original installed harness 111. The technician will leave the multi-functional original installed harness 111 in the original location engaged to the vehicle 101 and will leave the multi-functional original installed harness 111 electrically engaged to the non-critical components of the vehicle 101. To prevent grounding of the circuit within the overlay electrical harness 171 and those remaining active within the multi-functional original installed harness 111, the technician will clip the wire ends of these circuits on the multi-functional original installed harness that were previously engaged to the critical components of the vehicle 101.

Although, the process described above focuses on repairing a vehicle 101 with an electrical fault in a multi-functional original installed harness 111 for an engine 108, the service harness overlay procedure may be used for faults in any harness on the vehicle 101. The most susceptible harnesses are those engaged to the chassis 102 which are susceptible to abrasion due to the aforementioned causes. One harness for which this procedure could be used for is a chassis mounted Anti-lock Braking System (ABS) harness.

As described above, the process for performing a triage-like repair of an electrical fault in a vehicle multi-functional original installed harness 111 of the present invention, and including the steps of installing an overlay electrical harness 171 provide a number of advantages, some of which have been described above and others of which are inherent in the invention. Also, modifications may be proposed to the process of performing a triage-like repair of an electrical fault in a multi-functional original installed harness 111 including replacement with an overlay electrical harness 171 may be proposed without departing from the teachings herein. Accordingly, the scope of the invention is only to be limited as necessitated by the accompanying claims.

We claim:

1. A service harness overlay procedure for bypassing an electrical fault in a multi-functional original installed harness in a mobile vehicle, the vehicle having an engine controlled by an electronic control module, the engine having an engine coolant system and being engaged to a transmission and driveline and a chassis, and a cab having an air conditioning system, and the multi-functional original installed harness being electrically engaged to both critical and non-critical components of the vehicle, and engaged to the chassis through harness brackets, comprising the steps of:

(a) disconnecting electrically the multi-functional original installed harness from all critical components of the vehicle;

(b) engaging an overlay electrical harness physically adjacent to the multi-functional original installed harness;

(c) engaging electrically the overlay electrical harness to the previously disconnected critical components of the vehicle;

(d) leaving the multi-functional original installed harness the original physical location and leaving the multi-functional original installed harness electrically engaged to the non-critical components of the vehicle; and (e) wherein the critical components of the vehicle are those for which an electrical fault in a circuit in the multi-functional original installed harness will result in the engine failing to start or run, or will result in a service indicator light in the cab of the vehicle.

2. The procedure of claim 1, additionally comprising the step of:

(a) clipping wire ends of wire circuits on the multi-functional original installed harness previously engaged to the critical components of the vehicle.

3. The procedure of claim 2, wherein the critical components of the vehicle are more specifically comprised of:
   (a) the electronic control module;
   (b) an electronic control module ignition signal sensor;
   (c) a radiator fan solenoid;
   (d) a vehicle speed sensor engaged to the transmission and driveline;
   (e) a low engine coolant probe of the engine coolant system; and
   (f) a fan refrigerant pressure switch of the air conditioning system.

4. The procedure of claim 3, wherein the non-critical components of the vehicle are more specifically comprised of:
   (a) an alternator for the engine;
   (b) a refrigerant compressor status indicator;
   (c) an engine coolant water temperature sensor;
   (d) an ECM communications connector;
   (e) an engine ground detector;
   (f) an engine starting motor;
   (g) a transmission oil temperature indicator; and
   (h) a fuel valve status.

5. The procedure of claim 2, wherein said step of engaging the overlay electrical harness physically adjacent to the multi-functional original installed harness includes engaging the overlay electrical harness to the same harness brackets as the multi-functional original installed harness.

6. A service harness overlay procedure for bypassing an electrical fault in a multi-functional original installed harness in a mobile vehicle, the multi-functional original installed harness being electrically engaged to both critical and non-critical components of the vehicle, and engaged to the chassis through harness brackets, comprising the steps of:
   (a) disconnecting electrically the multi-functional original installed harness from all critical components of the vehicle;
   (b) engaging an overlay electrical harness physically adjacent to the multi-functional original installed harness;
   (c) engaging electrically the overlay electrical harness to the previously disconnected critical components of the vehicle;
   (d) leaving the multi-functional original installed harness the original physical location and leaving the multi-functional original installed harness electrically engaged to the non-critical components of the vehicle;
   (e) wherein the critical components of the vehicle are those for which an electrical fault in a circuit in the multi-functional original installed harness will result in the engine failing to start or run, or will result in a service indicator light in the cab of the vehicle; and
   (f) wherein said critical components include components in an Anti-lock brake System of the vehicle.

7. The procedure of claim 6, wherein said step of engaging the overlay electrical harness physically adjacent to the multi-functional original installed harness includes engaging the overlay electrical harness to the same harness brackets as the multi-functional original installed harness.

* * * * *